(12) United States Patent
Matt et al.

(10) Patent No.: US 10,864,604 B2
(45) Date of Patent: Dec. 15, 2020

(54) LASER PROCESSING MACHINE

(71) Applicant: TRUMPF Werkzeugmaschinen GmbH + Co. KG, Ditzingen (DE)

(72) Inventors: Philipp Matt, Schwieberdingen (DE); Thomas Haeberle, Vaihingen/Enz (DE); Florian Jarsch, Ditzingen (DE); Karsten Ruetz, Ludwigsburg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 239 days.

(21) Appl. No.: 16/131,126

(22) Filed: Sep. 14, 2018

(65) Prior Publication Data
US 2019/0009374 A1    Jan. 10, 2019

Related U.S. Application Data

(63) Continuation of application No. PCT/EP2017/055342, filed on Mar. 7, 2017.

(30) Foreign Application Priority Data

Mar. 14, 2016  (DE) .................. 10 2016 204 161

(51) Int. Cl.
| | | |
|---|---|---|
| *B23K 26/70* | (2014.01) | |
| *B23K 26/08* | (2014.01) | |
| *B23K 26/38* | (2014.01) | |

(52) U.S. Cl.
CPC .......... *B23K 26/706* (2015.10); *B23K 26/083* (2013.01); *B23K 26/0823* (2013.01); *B23K 26/38* (2013.01)

(58) Field of Classification Search
CPC .................................................. B23K 26/706
See application file for complete search history.

(56) References Cited

U.S. PATENT DOCUMENTS

2016/0228982 A1*  8/2016  Haji ................... B23K 26/08

FOREIGN PATENT DOCUMENTS

| CN | 104728345 A | 6/2015 |
|---|---|---|
| CN | 204504509 U | 7/2015 |

(Continued)

OTHER PUBLICATIONS

Trumpf, TruLaser Tube 5000, https://www.trumpf.com/en_US/products/machines-systems/laser-tube-cutting-machines/trulaser-tube-5000-fiber/ (Year: 2020).*

(Continued)

*Primary Examiner* — Ibrahime A Abraham
*Assistant Examiner* — John J Norton
(74) *Attorney, Agent, or Firm* — Fish & Richardson P.C.

(57) ABSTRACT

A laser processing machine has a processing area and a laser processing device. A workpiece can be processed by the laser processing device at a processing location via emission of laser radiation to generate a processing product. An environment of the processing area is shielded against the laser radiation by a protective housing. The processing product can be moved in a discharge direction to pass a boundary of the protective housing that is flexible in the discharge direction. A product rest, arranged below the processing location in the vertical direction and extending in the discharge direction, functions to store the processing product. In the vertical direction below the processing location, the protective housing extends in the discharge direction, forming an extension with which the protective housing extends over the product rest. The boundary limits the extension in the discharge direction and is arranged above the product rest.

16 Claims, 2 Drawing Sheets

(56) References Cited

FOREIGN PATENT DOCUMENTS

| | | |
|---|---|---|
| CN | 104889566 A | 9/2015 |
| CN | 104923924 A | 9/2015 |
| EP | 2130639 A1 * | 12/2009 ........... B23K 26/706 |
| EP | 2 827 206 A2 | 1/2015 |
| EP | 2 993 383 A1 | 3/2016 |
| JP | 2015-110243 A | 6/2015 |
| JP | 2016-052681 A | 4/2016 |

OTHER PUBLICATIONS

CN Office Action in Chinese Appln. No. 201780015326, dated Jan. 6, 2020, 13 pages (with English translation).
International Search Report and Written Opinion in International Application No. PCT/EP2017/055342, dated Jun. 28, 2017, 19 pages (with English translation).
"TruLaser Tube: Shape the future," TRUMPF Werkzeugmaschinen GmbH + Co. KG, 2013, 20 pages.
KR Intention to Grant in Korean Appln. No. 10-2018-7029361, dated Aug. 12, 2020, 6 pages (with English translation).

* cited by examiner

LASER PROCESSING MACHINE

CROSS REFERENCE TO RELATED APPLICATIONS

This application is a continuation of and claims priority under 35 U.S.C. § 120 from PCT Application No. PCT/EP2017/055342 filed on Mar. 7, 2017, which claims priority from German Application No. DE 10 2016 204 161.4, filed on Mar. 14, 2016. The entire contents of each of these prior applications are incorporated herein by reference.

TECHNICAL FIELD

The invention relates to laser processing machines, particularly to those having a laser processing device arranged in a processing area with a protective housing.

BACKGROUND

Such a laser processing machine is offered by the company TRUMPF Werkzeugmaschinen GmbH+ Co. KG, Johann-Maus-Strasse 2, 71254 Ditzingen, Germany under the name "TruLaser Tube 7000". This machine is used for cutting processing of tubes by means of a laser. Cutting tube processing operations are carried out in an operating space of the machine which is provided with a protective cabin. The protective cabin is used in particular to shield the environment of the machine against laser radiation which during a processing process is emitted inside the operating space at a processing location. A tube intended to be processed is pushed forward through an opening in the wall of the protective cabin in an axial direction into the interior of the operating space. Tube sections which have been produced by means of a cutting processing operation inside the operating space are discharged from the operating space in a discharge direction which extends perpendicularly to the axial advance direction. After the final separation cut, the tube sections initially reach under the action of gravitational force an inclined discharge member which is arranged below the processing location. Via the inclined discharge member, the tube sections leave the operating space through a wall opening of the protective cabin which wall opening is located in the discharge direction and acts as a discharge opening. In order to prevent laser radiation from leaving the protective cabin at the discharge opening thereof, the discharge opening is provided with a protective curtain which is flexible in the discharge direction and which can consequently be passed by the tube sections. The inclined discharge member and the discharge curtain on the wall of the protective cabin are adjoined in the discharge direction by a horizontal product rest on which the tube sections which have been produced beforehand are temporarily stored until the product rest is unloaded.

SUMMARY

One of the objects of the present invention is to optimize the shielding of the environment of a laser processing machine of the type mentioned in the introduction against laser radiation from the processing area of the machine.

One aspect of the invention features a laser processing machine including: a processing area having a protective housing, a laser processing device arranged in the processing area and by which a workpiece arranged in the processing area can be processed at a processing location to produce a processing product with an emission of laser radiation, and a product rest configured to store the processing product. An environment of the processing area is shielded against the laser radiation by the protective housing, and the processing product is movable in a discharge direction to be discharged from the protective housing to pass a boundary of the protective housing that is flexible in the discharge direction. The product rest is arranged in a vertical direction below the processing location and extends in the discharge direction. The protective housing expands, in a vertical direction below the processing location, with an expansion being formed in the discharge direction and extends with the expansion over the product rest, and the boundary of the protective housing limits the expansion of the protective housing in the discharge direction and is arranged in a vertical direction above the product rest. The boundary can be directly adjacent to the product rest.

In the laser processing machine, the location at which a processing product which has been produced in the processing area of the machine by laser radiation leaves the protective housing of the processing area is offset both in a vertical direction and in the discharge direction significantly with respect to the location of the emission of the laser radiation. Due to this offset, at most a relatively small portion of the laser radiation emitted at the processing location reaches the boundary of the protective housing which boundary is passed by the processing products to be discharged and which is flexible in the discharge direction. At the unloading side of the laser processing machine according to the invention, the environment thereof is consequently shielded against laser radiation from the processing area of the machine in a particularly reliable manner. In particular on laser processing machines for cutting tube processing, the discharge direction may extend perpendicularly to an advance direction in which a tube intended to be processed is supplied to the processing area of the machine. The product rest may be orientated horizontally but may also be inclined with respect to the horizontal. The processing products can be temporarily deposited on the product rest. It is conceivable that there be provided between the location of the production of the processing products and the product rest a transfer device, by which the processing products are supplied to the product rest. Transfer devices which it is possible to use include, for example, an inclined member via which the processing products can reach the product rest in particular under the action of gravitational force. The boundary of the protective housing which is flexible in the discharge direction can be constructed like a laser protective curtain.

In some implementations, the protective housing expands in the discharge direction in a stepped manner. The boundary which is flexible in the discharge direction is provided at a rest-side step of the protective housing and at that location on a step portion which extends perpendicularly to the product rest over which the expansion of the protective housing extends. Due to the stepped shape, the protective housing is able at the inner side thereof to block an emission of the laser radiation generated in the processing area of the machine to the discharge opening of the protective housing in a particularly effective manner. If the staircase-like protective housing is appropriately configured, it is completely impossible for laser radiation emitted at the processing location to directly reach the discharge opening of the protective housing.

The boundary of the protective housing which is flexible in the discharge direction can be constructed in a multi-layer construction. At least two boundary elements of the multi-layer boundary extend perpendicularly to the discharge direction and are offset with respect to each other in the discharge direction. Due to the mutual offset of the boundary elements, it can be ensured that processing products which move in the discharge direction pass the individual boundary elements one after the other. If a boundary element is redirected as a result of the passage of a processing product into a position due to which the shielding action of the boundary element is reduced, at least one boundary element which in the discharge direction or counter to the discharge direction follows the redirected boundary element can maintain an orientation in which the boundary element can provide the maximum shielding effect which is intended for the boundary element. There is produced a sluice effect, due to which processing products can be discharged during the production time out of the protective housing through the boundary which is flexible in the discharge direction.

Directly mutually adjacent boundary elements are capable of a shielding in the described manner if at least two of the boundary elements of the boundary of the protective housing which is flexible in the discharge direction have in the discharge direction a mutual distance which is as large as or larger than the dimension which the processing product which is moved in the discharge direction has in the discharge direction.

In some examples, beam protective curtains arranged in a plurality of planes which are offset with respect to each other in the discharge direction can be used as boundary elements. It may be advantageous to use as the material for the beam protective curtains a rubber material which, on the one hand, has adequate tear-resistance, self-extinguishing properties and resistance against laser irradiation, but on the other hand is also sufficiently resilient and bendable so that the movement which is carried out by the processing products in the discharge direction is not counteracted by any substantial resistance. If the beam protective curtains contact the product rest, correspondingly low friction values ensure that the flexibility of the protective curtains in the discharge direction is not impaired by friction which occurs during movements of the protective curtains carried out relative to the product rest in the discharge direction.

The shielding behaviour of the boundary elements of a multi-layer flexible boundary of the protective housing may be adapted to changing requirements, for example to changing dimensions of the processing products intended to be discharged from the protective housing, by at least two of the boundary elements being able to be positioned relative to each other in the discharge direction.

The efficiency of the shielding of the environment against laser radiation from the processing area of the laser processing machine by the boundary of the protective housing which is flexible in the discharge direction is dependent inter alia on the orientation with which the processing products intended to be discharged from the protective housing are arranged with respect to the flexible boundary. Depending on the orientation of the processing products with respect to the flexible boundary, the time which the processing products need to pass the flexible boundary and during which the flexible boundary is redirected from the position in which it exhibits a maximum shielding action becomes shorter or longer. On multi-layer flexible boundaries of the protective housing, the orientation of the processing products intended to be discharged from the protective housing is additionally decisive in terms of whether the processing product, when leaving the protective housing, passes and redirects boundary elements of the multi-layer boundary one after the other or simultaneously.

Against this background, in a further embodiment of the laser processing machine according to the invention, there is provided an adjusting device which is arranged at the side of the flexible boundary or the boundary elements of the flexible boundary, which side is located in the opposite direction to the discharge direction, and which can advantageously orientate processing products moved in the discharge direction with respect to the flexible boundary or the boundary elements of the flexible boundary.

If boundary elements of a multi-layer flexible boundary of the protective housing extend parallel with each other perpendicularly to the discharge direction, the adjusting device in a development of the laser processing machine according to the invention ensures that the processing products which are moved in the discharge direction are orientated parallel with the boundary elements.

In some examples, an inclined plane can be used as a structurally simple and nonetheless operationally reliable adjusting device. The inclined plane can extend in the discharge direction and bridge in a vertical direction the intermediate space between the product rest and a processing level on which a processing product is arranged during production.

In some implementations, a particularly operationally reliable discharge of processing products from the protective housing of the processing area can be provided, where the product rest over which the expansion of the protective housing engages can be driven in the discharge direction and can consequently be used to move processing products from the interior of the protective housing to the outer side thereof with the processing products passing the boundary of the protective housing which is flexible in the discharge direction.

In a development of the invention, the product rest which can be driven in the discharge direction is formed by at least one circulating endless conveying means (or device), for example, by at least one conveyor band or at least one conveyor belt or both of the at least one conveyor band and the at least one conveyor belt.

The product rest which can be driven in the discharge direction may be constructed at the processing product side such that a desired orientation (e.g., a particular orientation) of the processing products moved in the discharge direction during the removal of the processing products from the protective housing is maintained. For example, the product rest may be provided with corresponding protrusions which are spaced apart from each other in the discharge direction and between which the processing products are deposited and which prevent an undesirable displacement of the processing products in the discharge direction.

The shielding action of the boundary of the protective housing which is flexible in the discharge direction may also be influenced by the occupation of the product rest outside the protective housing. It is thus, for example, conceivable for an over-occupation of the product rest outside the protective housing to lead to a backlog of processing products into the interior of the protective housing and for the flexible boundary of the protective housing due to the backlog of the processing products to be redirected into a position in which only a reduced shielding action is achieved. For at least this reason, there can be provided a detection device by which the occupation of the product rest at the side of the boundary of the protective housing which is flexible in the discharge direction, which side is located in the discharge direction, can be detected. When the detection device is connected to a control device of the laser processing machine, in particular to a numerical machine control unit, it is, for example, possible when an over-occupation of the product rest is detected for an automatic emergency shutdown of the laser processing device arranged in the processing area of the machine to be carried out.

In another embodiment of the laser processing machine according to the invention, the product rest has store elements, for example drivingly movable conveyor bands or conveyor belts which are spaced apart from each other with intermediate spaces being formed. In the interests of an effective shielding of the environment of the laser processing machine against laser radiation from the processing area of the machine, the intermediate space(s) of the store elements is/are provided with a cover. The cover can include one or more cover sheets. The cover of the intermediate space(s) can be releasably mounted, such that the store elements of the product rest and the interior of the protective housing can be accessible if necessary.

Good accessibility of the interior of the protective housing or the processing area of the laser processing machine can be ensured in a development of the invention by at least a portion of the expansion of the protective housing being able to be pivoted about a pivot axis into one of an open position and a closed position.

Additional features and advantages of the invention can be found in the following detailed description of an embodiment of the invention, by way of the drawings which show details essential to the invention, and in the claims. The features shown in the drawings are shown so as to be able to make the particularities according to the invention clearly visible. The various features may each be implemented in isolation or together in any desired combination in variants of the invention.

DETAILED DESCRIPTION

Figure 1:
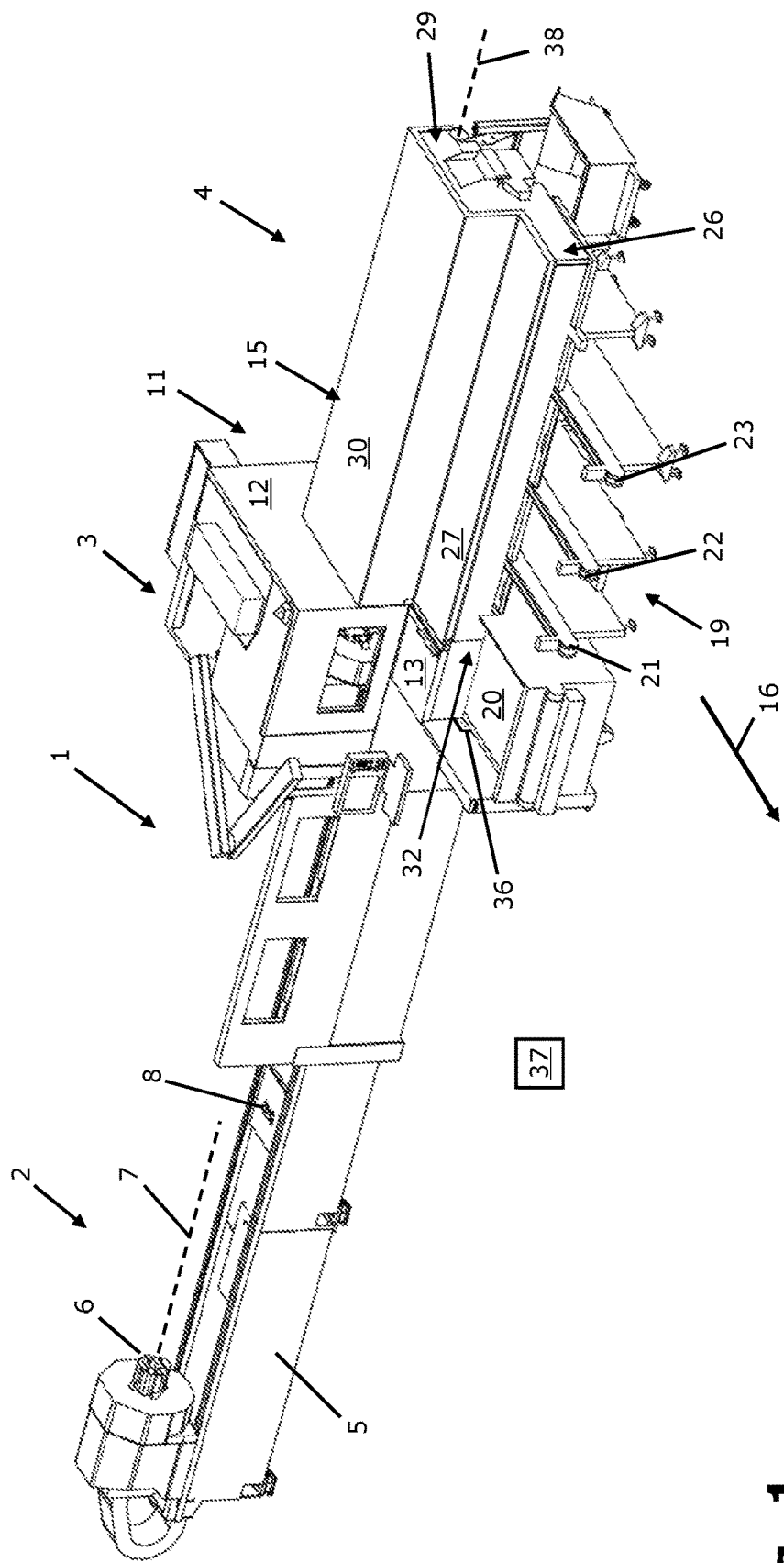
FIG. 1 shows a laser processing machine for cutting tube processing having a closed protective housing.

According to FIG. 1, a laser processing machine 1 for cutting tube processing has a tube feeding device 2, a processing area 3 and an unloading station 4.

The tube feeding device 2 is of conventional construction type and includes a clamping chuck 6 which is rail-guided on a carrier structure 5 and which can automatically move along the carrier structure 5. The clamping chuck 6 serves in known manner to fix the rear end of a workpiece which is intended to be processed in the form of a tube 7. The tube 7 is indicated in FIG. 1 by a dashed tube axis. Between the clamping chuck 6 and the processing area 3, the tube 7 intended to be processed is supported on loading-side tube supports 8. In FIG. 1, one of the loading-side tube supports 8 can be seen and is shown in a position in which the loading-side tube support 8 is recessed in the carrier structure 5 of the tube feeding device 2 and can consequently be travelled over by the clamping chuck 6 along the carrier structure 5. By positioning movements of the clamping chuck 6, the tube 7 is gradually pushed forwards in an axial direction into the processing area 3 of the laser processing machine 1.

Figure 2:
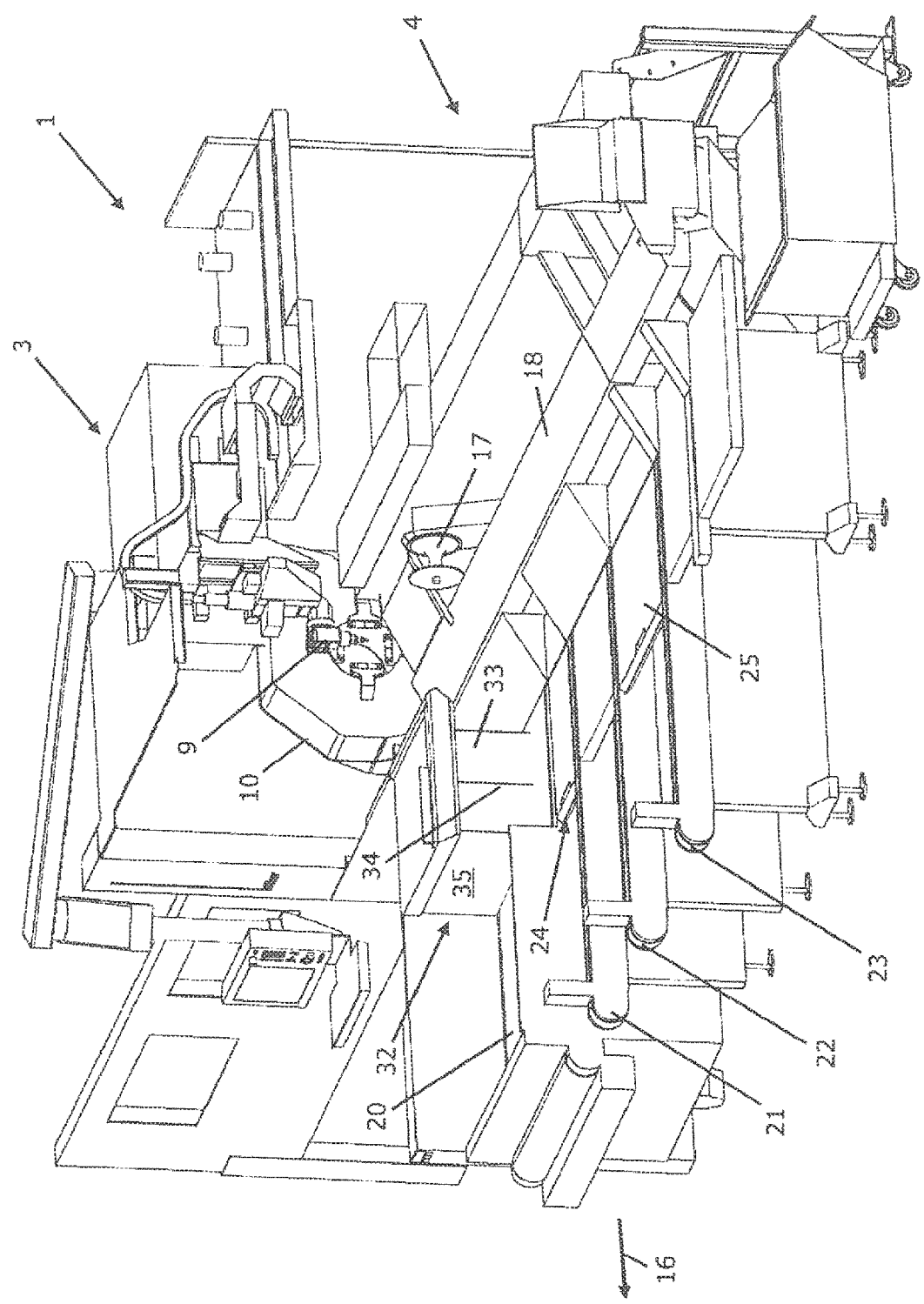
FIG. 2 shows the laser processing machine according to FIG. 1 with the protective housing partially removed.

As can be seen in FIG. 2, a laser cutting head 9 which can be moved in multiple axes is provided in the processing area 3 as a laser processing device. During operation, the laser cutting head 9 emits in known manner a laser beam, which carries out a separating processing operation on the tube 7 at a processing location. In the direct vicinity of the processing location, the tube 7 is supported during the processing operation by a steady rest 10. The steady rest 10 supports the tube 7 in a radial direction and further enables a rotational movement of the tube 7 about the tube axis. To be able to reach the tube 7 over the entire periphery thereof with the laser processing beam, it is possible to rotate the tube 7 by the clamping chuck 6 about the tube axis.

To shield the environment of the laser processing machine 1 against laser radiation from the processing area 3, a protective housing 11 is provided for the processing area 3.

According to FIG. 1, the protective housing 11 of the laser processing machine 1 is constructed in several parts.

The laser cutting head 9 and the steady rest 10 are accommodated in an operating space cabin 12 of the protective housing 11. The wall of the operating space cabin 12 has at the side facing the tube feeding device 2 an inlet opening which is not shown and through which the tube 7 intended to be processed is moved by the tube feeding device 2 in an advance direction into the interior of the operating space cabin 12 and, with the tube processing operation being continued, is fed relative to the laser cutting head 9 in the advance direction.

At the unloading side, the protective housing 11 has a fixed housing portion 13 which is close to the cutting head 9 and a pivotable hood 15 which is arranged beside the fixed housing portion 13.

On the fixed housing portion 13 close to the cutting head 9, short tube sections, which are produced as processing products at the processing location of the laser cutting head 9 by a cutting processing operation of the tube 7, are discharged from the protective housing 11 in a discharge direction which extends perpendicularly to the advance direction of the tube 7 and which is illustrated in FIG. 1 by an arrow 16. Tube sections of a relatively large length produced by the laser cutting head 9 as processing products are supported already during the cutting tube processing operations at the side of the laser cutting head 9 remote from the tube feeding device 2 on unloading-side tube supports 17, of which one is shown in FIG. 2.

The unloading-side tube support 17 which can be seen in FIG. 2 is arranged below the pivotable hood 15. The portion of the tube 7 intended to be processed, which is supported by the unloading-side tube support 17 protrudes at the unloading side of the operating space cabin 12 through an unloading-side wall opening into the space below the pivotable hood 15.

Also the tube sections which, as a result of their length, are arranged below the pivotable hood 15 when the final separation cut is made by the laser cutting head 9 leave the protective housing 11 in the discharge direction 16.

Regardless of their length, the tube sections produced by the laser cutting head 9 first reach, after the final separation cut, under the action of gravitational force an inclined plane in the form of an inclined discharge member 18. The inclined discharge member 18 extends in the discharge direction 16 and bridges in a vertical direction an intermediate space between a processing level on which the processing product separated from the remaining tube 7 is located when it is produced and the level of a product rest 19.

The product rest 19 includes in the example illustrated store elements in the form of a conveyor band 20 and in the form of conveyor belts 21, 22, 23. The conveyor band 20 and the conveyor belts 21, 22, 23 are circulating endless conveying means which are driven in the discharge direction 16.

In the advance direction of the tube 7, the conveyor band 20 and the conveyor belts 21, 22, 23 are spaced apart from each other with intermediate spaces being formed. To shield the environment of the laser processing machine 1 at the bottom side against laser radiation from the processing area 3, there is used in the region of the product rest 19 a cover 24 including covering sheets 25 which are arranged between the conveyor band 20 and the conveyor belts 21, 22, 23. The cover 24 accordingly forms a portion of the protective housing 11.

The product rest 19 is covered by the protective housing 11 with a rest-side step 26 of the protective housing 11 in the discharge direction 16.

The rest-side step 26 is an expansion of the protective housing 11, which expansion is arranged in a vertical direction below the processing location of the laser cutting head 9 and extends in the discharge direction 16, where the rest-side step 26 in the illustrated example is formed by the fixed housing portion 13 close to the cutting head and a lower step 27 of the pivotable hood 15.

In the opposite direction to the discharge direction 16, the rest-side step 26 of the protective housing 11 is adjoined by a processing-side step 29 of the protective housing 11 which is constructed in a staircase-like manner. The processing-side step 29 of the protective housing 11 includes the portion of the operating space cabin 12 arranged above the rest-side step 26 and an upper step 30 of the pivotable hood 15.

The rest-side step 26 of the protective housing 11 has on a step portion which extends perpendicularly to the product rest 19 a boundary 32 which is flexible in the discharge direction 16 and which extends in the advance direction of the tube 7 over the entire length of the fixed housing portion 13 close to the cutting head and of the pivotable hood 15. Each of these portions of the protective housing 11 is associated with a portion of the boundary 32 which is flexible in the discharge direction 16.

As can be seen in FIG. 2, the flexible boundary 32 is constructed in a multi-layered manner, in the example illustrated with three layers. The flexible boundary 32 has over the entire length thereof three curtain-like boundary elements 33, 34, 35 which are offset with respect to each other in the discharge direction 16. Each of the boundary elements 33, 34, 35 extends perpendicularly to the discharge direction 16 and consequently parallel with the advance direction of the tube 7. The configuration of the flexible boundary 32 on the pivotable hood 15 corresponds to the configuration of the portion of the flexible boundary 32 shown in FIG. 2 on the fixed housing portion 13 close to the cutting head 9.

A tube section produced by cutting processing the tube 7 reaches the processing-side boundary element 33 under the action of gravitational force via the inclined discharge member 18. The inclined discharge member 18 acts at the same time as an adjusting device by which the tube section intended to be discharged from the protective housing 11 is orientated with a desired orientation, in this instance parallel, with respect to the flexible boundary 32. A corresponding orientation movement is carried out by tube sections at the transition between the inclined discharge member 18 and the horizontal product rest 19.

Depending on the length of the tube section produced, the tube section arriving at the processing side of the boundary element 33 is moved by the conveyor band 20 or by at least two of the conveyor belts 21, 22, 23 in the discharge direction 16. During its movement in the discharge direction 16, the tube section first passes the boundary element 33 which for this purpose is redirected from the vertical starting position thereof in the discharge direction 16. In this instance, the boundary element 33 carries out counter to the action of a resilient restoring force a pivot movement about the location of securing thereof to the rigid portion of the wall of the protective housing 11.

Due to corresponding dimensions of the distance between the individual boundary elements 33, 34, 35, the boundary elements 33, 34, 35 are passed by the tube section one after the other. The mutual distance of the boundary elements 33, 34, 35 in the discharge direction 16 can be adjusted in a variable manner. For this purpose, at least a part of the boundary elements 33, 34, 35 is secured to the rigid portion of the wall of the protective housing 11 so as to be able to be released and repositioned in the discharge direction 16.

Before a tube section which is moved in the discharge direction 16 can pivot the boundary element 34 from the vertical starting position in the discharge direction, the boundary element 33 which has previously been passed by the tube section has returned into the vertical starting position. Corresponding relationships occur when the tube section intended to be discharged from the protective housing 11 passes the boundary element 35.

To enable the boundary elements 33, 34, 35 to carry out the described redirection and return movements in an unimpeded manner, the boundary elements 33, 34, 35 are at the lower end thereof in each case slightly spaced apart from the product rest 19. Due to the resilience of the material of the boundary elements 33, 34, 35, they carry out the return movements automatically. As long as an adequate flexibility of the boundary elements 33, 34, 35 in the discharge direction 16 is not endangered thereby, it is also conceivable for the boundary elements 33, 34, 35 to be allowed to contact the product rest 19.

In the region of the fixed housing portion 13 close to the cutting head 9, the occupation of the product rest 19 or the conveyor band 20 with tube sections intended to be discharged is monitored by a detection device. A photoelectric barrier 36 is provided in the example illustrated as a detection device.

If the photoelectric barrier 36 detects on the conveyor band 20 a backlog of tube sections which could lead to an undesirable opening of the boundary 32 which is flexible in the discharge direction 16, the laser cutting head 9 inside the protective housing 11 is automatically stopped by switching off a laser generator which is not shown and which supplies the laser cutting head 9 with laser radiation. For this purpose, the photoelectric barrier 36 is connected to a numerical controller 37 which is schematically illustrated in FIG. 1 and which in turn is connected to the laser generator and controls all the functions of the laser processing machine 1.

To provide accessibility of the interior of the protective housing 11, the pivotable hood 15 including the associated portion of the boundary 32 which is flexible in the discharge direction 16 can be pivoted about a pivot axis 38 which is illustrated with broken lines in FIG. 1 into an open position and a closed position. In this instance, a pneumatic pivot mechanism of conventional construction type is used for pivoting the pivotable hood 15. Other types of pivot drives for the pivotable hood 15, for example, pivot drives with electrical cylinders, are conceivable.

If required, it is further possible to remove the cover sheets 25 of the cover 24 which are provided between the conveyor band 20 and the conveyor belts 21, 22, 23. For this purpose, the cover sheets 25 are releasably mounted on the carrier structure of the conveyor band 20 and the conveyor belts 21, 22, 23.

A number of embodiments of the invention have been described. Nevertheless, it will be understood that various modifications may be made without departing from the spirit and scope of the invention. Accordingly, other embodiments are within the scope of the following claims.

What is claimed is:

1. A laser processing machine comprising:
   a processing area having a protective housing;
   a laser processing device arranged in the processing area and by which a workpiece arranged in the processing area can be processed at a processing location to produce a processing product with an emission of laser radiation, wherein an environment of the processing area is shielded against the laser radiation by the protective housing, and wherein the processing product is movable in a discharge direction to be discharged from the protective housing to pass a boundary of the protective housing that is flexible in the discharge direction; and
   a product rest configured to store the processing product, wherein the product rest is arranged in a vertical direction below the processing location and extends in the discharge direction,
   wherein, vertically below the processing location, the protective housing is enlarged with an extension being formed in the discharge direction and extends with the extension over the product rest, and
   wherein the boundary of the protective housing is arranged at an end of the extension of the protective housing in the discharge direction and in a vertical direction above the product rest.

2. The laser processing machine of claim 1, wherein the boundary of the protective housing is arranged directly adjacent to the product rest.

3. The laser processing machine of claim 1, wherein the protective housing is enlarged in the discharge direction with the extension formed by the protective housing being constructed in a stepped manner at a side of the protective housing located in the discharge direction, and
   wherein the protective housing comprises:
     a rest-side step adjacent to the product rest in the vertical direction, the rest-side step having the boundary of the protective housing, the boundary being on a step portion extending perpendicularly to the product rest, and
     a processing-side step arranged in a vertical direction vertically above the rest-side step and being offset with respect to the rest-side step in an opposite direction to the discharge direction.

4. The laser processing machine of claim 1, wherein the boundary of the protective housing is constructed in multiple layers and comprises a plurality of boundary elements which extend perpendicularly to the discharge direction and are offset with respect to each other in the discharge direction, and
   wherein the plurality of boundary elements are flexible in the discharge direction and configured to be passed by the processing product being moved in the discharge direction.

5. The laser processing machine of claim 4, wherein at least two of the boundary elements are offset with respect to each other in the discharge direction with a mutual distance, and
   wherein the mutual distance is no smaller than a dimension of the processing product in the discharge direction.

6. The laser processing machine of claim 4, wherein at least two of the boundary elements are positioned relative to each other with a mutual distance, and wherein the mutual distance of the boundary is changeable in the discharge direction.

7. The laser processing machine of claim 4, further comprising:
   an adjusting device arranged at a side of the boundary of the protective housing, the side being located in an opposite direction to the discharge direction,
   wherein the adjusting device has an inclined discharge member comprising an inclined plane that extends in the discharge direction between the product rest and a processing level on which the processing product is arranged during the production vertically above the product rest,
   wherein the inclined discharge member is configured to orientate the processing product moved in the discharge direction with a particular orientation with respect to the boundary.

8. The laser processing machine of claim 7, wherein the inclined discharge member is configured to orientate processing products moved in the discharge direction with respect to the boundary in respective orientations, such that the processing products pass the boundary elements one after the other in the discharge direction.

9. The laser processing machine of claim 7, wherein the device inclined discharge member is configured to orientate the processing product with a particular orientation parallel with the boundary or parallel with the boundary elements, and
   wherein the boundary elements extend parallel with each other perpendicularly to the discharge direction.

10. The laser processing machine of claim 1, wherein the product rest is operable to be driven in the discharge direction, such that the processing product is moved in the discharge direction by the driven product rest to pass the boundary of the protective housing.

11. The laser processing machine of claim 10, wherein the product rest is formed by at least one circulating endless conveying device.

12. The laser processing machine of claim 11, wherein the at least one circulating endless conveying device comprises at least one conveyor band or at least one conveyor belt or both.

13. The laser processing machine of claim 10, further comprising:
   a photoelectric barrier configured to detect an occupation of the product rest at a side of the boundary of the protective housing that is located in the discharge direction.

14. The laser processing machine of claim 10, wherein the product rest has store elements spaced apart from each other with at least one intermediate space, and
   wherein the at least one intermediate space of the store elements is provided with a cover.

15. The laser processing machine of claim 14, wherein the cover of the at least one intermediate space of the store elements is releasably mounted.

16. The laser processing machine of claim 14, wherein at least a portion of the extension of the protective housing is pivotal about a pivot axis into one of an open position and a closed position.

* * * * *